Oct. 14, 1947.  S. W. WARNER  2,429,039
IMPLEMENT FOR WELDING OR THE LIKE
Filed Nov. 6, 1944
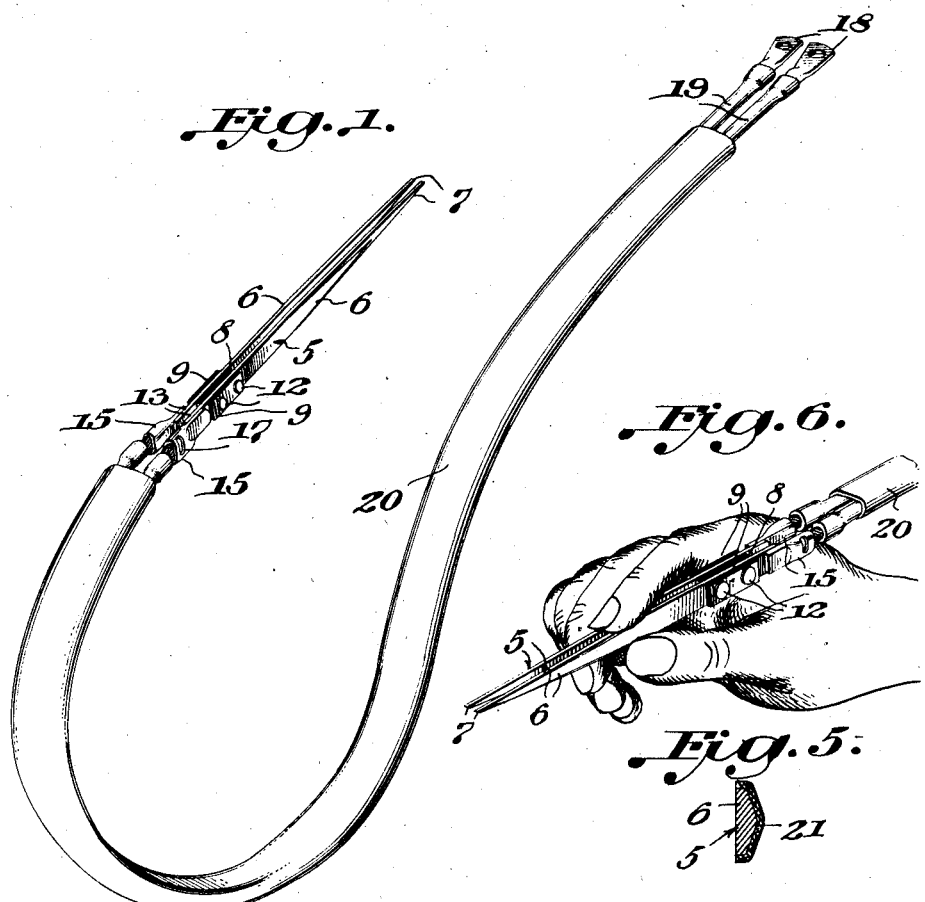
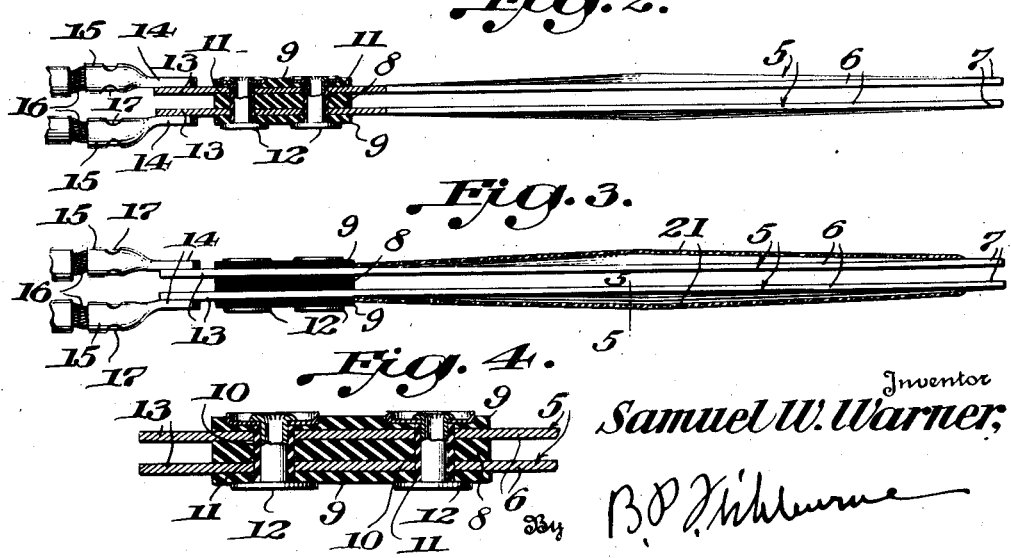
Inventor
Samuel W. Warner,
By B. P. Fishburne
Attorney Patented Oct. 14, 1947

2,429,039

UNITED STATES PATENT OFFICE 2,429,039

IMPLEMENT FOR WELDING OR THE LIKE

Samuel W. Warner, Newark, N. J., assignor of one-half to Herman Bernstein and one-half to Joe Sodowick, both of Newark, N. J.

Application November 6, 1944, Serial No. 562,144

2 Claims. (Cl. 219—26)

My invention relates to a welding implement which may be used in general welding, spot welding, spot soldering or the like.

An important object of the invention is to provide an implement of the above mentioned character which is slender and may be conveniently manipulated in ordinarily inaccessible spaces, for welding or soldering small parts.

A further object of the invention is to provide an implement of the above mentioned character which is in the nature of a pair of tweezers and which can be manipulated like an ordinary pair of tweezers.

A further object of the invention is to provide means for attaching a tweezers unit to the lead wires, which will permit of the substitution of another tweezers unit when desired without injury to the lead wires.

A further object of the invention is to provide reliable and simple means for securely connecting the blades of the tweezers unit and thoroughly insulating the same.

A further object of the invention is to provide a welding implement of the above mentioned character which may be employed in welding without the necessity of electrically insulating the blades of the tweezers unit which are engaged in the hand of the operator.

A further object of the invention is to provide means for heat insulating the blades of the tweezers unit when the device is used in soldering.

A further object of my invention is to provide a device of the above mentioned character of a shape and size to be conveniently held in the hand like a pencil.

Other objects of the invention and advantages thereof will be apparent during the course of the following description.

In the accompanying drawings forming a part of this application and in which like numerals are employed to designate like parts through the same, Figure 1 is a perspective view of a welding or soldering implement embodying my invention, Figure 2 is a plan view of the tweezers unit, parts in central longitudinal section, Figure 3 is a plan view of the tweezers unit showing heat insulation applied to the tweezers blade, Figure 4 is an enlarged central longitudinal section thru the tweezers blades and connecting means, Figure 5 is a transverse section taken on line 5—5 of Figure 3, and, Figure 6 is a perspective view of the device, held in the hand of the operator like a pencil.

In the drawings, wherein for the purpose of illustration is shown a preferred embodiment of my invention, the numeral 5 designates a tweezers unit as a whole, which is slender and includes opposed blades 6, tapering forwardly to provide pointed ends 7. These blades are formed of metal such as copper or any other suitable metal or any suitable alloy. The blades are tensioned to move to the open position when released.

Means are provided to connect the rear end portions of the blades 6 and to thoroughly electrically insulate them. This means comprises a strip or block of fibre 8 disposed between the rear end portions of the blades and the blades project rearwardly beyond the insulating fibre block 8, as shown. Disposed upon the outer surfaces of the blades 6 adjacent to and in alignment with the block 8 are electrical insulating strips 9, preferably formed of fibre. The blades 6, block 8 and strips 9 are provided with aligned circular openings 10 for receiving insulating tubes 11, preferably formed of "Bakelite." The blades 6, block 8 and strips 9 are all rigidly secured together by transverse attaching elements 12, shown as rivets, altho other attaching means may be used, such as pins, bolts or screws. The rivets serve to rigidly hold the parts together and are thoroughly insulated from the blades 6.

The blades 6 extend rearwardly beyond the block 8, as described, providing rear extensions 13. These rear extensions are attached to metal terminals 14 by soldering. These metal terminals have sockets 15 to receive the forward ends of lead wires 16, which are clamped within the tubular sockets 15, by forcing portions of the tubular sockets inwardly, shown at 17. By clamping the tubular sockets 15 to the wires 16, the terminals 14 may be subjected to heat when soldering them to the rear extensions 13 or when melting the solder to separate the terminals from the extensions 13, without disturbing the electrical connection between the terminals and the wires 16. The lead wires 16 extend rearwardly and are suitably connected with terminals 18, for attachment of the terminals of the usual transformer. The wires 16 are enclosed in electrical insulation 19 and an outer electrical insulating sleeve 20 is employed to receive both wires 16, serving to hold them in close relation and providing further insulation. The outer sleeve 20 preferably terminates near the tubular sockets 15, as shown.

When the implement is used in soldering or spot soldering, the blades 6 may heat sufficiently to cause discomfort to the hand. I therefore contemplate applying a heat insulating coating 21 to the outer faces of the blades 6. This coating may extend from the strips 9 to points near and spaced from the forward ends of the blades 6. The coating 21 preferably extends over the edges of the blades 6, Figure 5. The coating 21 may be formed of synthetic lacquer having insulating material incorporated therein, such as finely divided asbestos. This lacquer is applied to the blades by a brush, and which will dry thereon.

The operation of the implement is as follows:

The voltage supplied to the tweezers blades 6 is low, ordinarily one-half volt and usually ten amperes being used. This current will not cause discomfort to the operator holding the blades 6 in the hand in welding, even if the blades 6 do not have heat insulating coating or covering 21. By employing a tweezers unit the blades 6 are long and slender and can be manipulated in small spaces, otherwise ordinarily inaccessible. The tweezers unit is very useful in welding or spot welding parts in radio equipment, such as in welding a terminal to a grid, or other part. The tweezers unit may advantageously be from four to five inches long, altho this length may be varied. The blades 6 have a width corresponding roughly to the width of an ordinary lead pencil and are about three-eighths of an inch wide, and the outer faces of the blades are about three-eighths of an inch apart when open. This enables the tweezers element to be held in the hand like a pencil when writing, Figure 6, so that it can be held between the thumb and third or longest finger. This renders it particularly convenient in manipulating the tweezers. The tweezers unit can also be held in the hand in a different manner, as is obvious. The parts to be welded are brought between the points 7 of the blades 6, and the blades 6 are then pressed inwardly so that these parts are securely pressed together during the welding period, which is usually a fraction of a cycle. When the tweezers element is used to spot solder it may be held in the hand in the same manner and the heat insulating coating 21 will protect the hand from excessive heat. Particular attention is called to the fact that the coating 21 is relatively thin and therefore does not render the tweezer element bulky.

It is to be understood that the form of my invention herewith shown and described is to be taken as a preferred example of the same and that various changes in the shape, size, and arrangement of parts may be resorted to without departing from the spirit of my invention or the scope of the sub-joined claims.

Having thus described my invention, what I claim is:

1. An implement of a shape and size so that it may be held in the hand like a pencil, said implement being employed in welding, spot welding, or soldering small parts, said implement comprising long, narrow resilient opposed blades which do not cross, insulating means rigidly connecting the rear end portions of the blades and retaining the blades spaced and terminating near the rear ends of the blades and spaced a short distance from such rear ends, terminals arranged upon the outer faces of the rear ends of the blades and soldered to such outer faces and having tubular sockets, the terminals and sockets extending axially of the blades, insulated wires extending into the sockets and clamped therein, and an insulating tube receiving the insulated wires and holding them together, said insulating tube terminating near and short of the sockets, the forward ends of the blades being biased open.

2. An implement of a shape and size so that it may be held in the hand like a pencil, said implement being employed in welding, spot welding, or soldering small parts, said implement comprising long narrow resilient opposed blades which do not cross, insulating means rigidly connecting the rear end portions of the blades and retaining the blades spaced and terminating near the rear ends of the blades and spaced from such rear ends, terminals rigidly secured to the rear ends of such blades and having tubular sockets, the terminals and sockets extending axially of the blades and the sockets extending outwardly beyond the rear ends of the blades, insulated wires extending into the sockets and clamped therein, and an insulating tube receiving the insulated wires and holding them together, the insulating tube terminating near the sockets, the forward ends of the blades being biased open.

SAMUEL W. WARNER.

REFERENCES CITED

The following references are of record in the file of this patent:

UNITED STATES PATENTS

| Number | Name | Date |
|---|---|---|
| 1,443,798 | Mattice | Jan. 30, 1923 |
| 1,899,220 | Wappler | Feb. 28, 1933 |
| 1,127,741 | Dixon | Feb. 9, 1915 |
| 1,562,647 | Kaisling | Nov. 24, 1925 |
| 1,969,029 | Ostertag | Aug. 7, 1934 |

FOREIGN PATENTS

| Number | Country | Date |
|---|---|---|
| 183,006 | Switzerland | June 2, 1936 |